US009000112B2

(12) United States Patent
Ryu et al.

(10) Patent No.: US 9,000,112 B2
(45) Date of Patent: *Apr. 7, 2015

(54) RESIN BLEND FOR MELTING PROCESS

(75) Inventors: Jin Young Ryu, Daejeon (KR); Houng Sik Yoo, Seoul (KR); Hak Shin Kim, Daejeon (KR); Eun Joo Choi, Daejeon (KR); Young Jun Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/879,505

(22) PCT Filed: Oct. 14, 2011

(86) PCT No.: PCT/KR2011/007681
§ 371 (c)(1),
(2), (4) Date: Aug. 19, 2013

(87) PCT Pub. No.: WO2012/050401
PCT Pub. Date: Apr. 19, 2012

(65) Prior Publication Data
US 2013/0323509 A1 Dec. 5, 2013

(30) Foreign Application Priority Data

Oct. 14, 2010 (KR) .................. 10-2010-0100386
Oct. 14, 2011 (KR) .................. 10-2011-0105364
Oct. 14, 2011 (KR) .................. 10-2011-0105366

(51) Int. Cl.

| | | |
|---|---|---|
| C08L 33/08 | (2006.01) | |
| C08K 3/36 | (2006.01) | |
| C08K 9/04 | (2006.01) | |
| C08L 25/04 | (2006.01) | |
| C08J 5/00 | (2006.01) | |
| C08L 33/20 | (2006.01) | |
| C08L 27/06 | (2006.01) | |
| C08L 67/00 | (2006.01) | |
| C08L 69/00 | (2006.01) | |
| B32B 27/08 | (2006.01) | |
| B32B 27/20 | (2006.01) | |
| B32B 27/30 | (2006.01) | |

(52) U.S. Cl.
CPC . *C08L 33/20* (2013.01); *C08K 3/36* (2013.01); *C08L 25/04* (2013.01); *C08L 27/06* (2013.01); *C08L 33/08* (2013.01); *C08L 67/00* (2013.01); *C08L 69/00* (2013.01); *B32B 27/08* (2013.01); *B32B 27/20* (2013.01); *B32B 27/308* (2013.01); *B32B 2270/00* (2013.01)

(58) Field of Classification Search
USPC ........ 526/317.1, 318; 525/191–241; 524/264, 524/500–587; 428/402.24, 446; 264/234
See application file for complete search history.

(56) References Cited

U.S. PATENT DOCUMENTS

| | | | |
|---|---|---|---|
| 6,565,763 B1 * | 5/2003 | Asakawa et al. ................. | 216/56 |
| 2008/0160289 A1 * | 7/2008 | Lin ............................... | 428/327 |
| 2010/0168355 A1 | 7/2010 | Shih et al. | |
| 2010/0249272 A1 | 9/2010 | Kim et al. | |
| 2013/0288057 A1 * | 10/2013 | Ryu et al. ...................... | 428/404 |

FOREIGN PATENT DOCUMENTS

| | | | |
|---|---|---|---|
| KR | 1994-0000018 B1 | | 1/1994 |
| WO | 2009/134653 A1 | | 11/2009 |
| WO | WO 2009/134653 | * | 11/2009 |

OTHER PUBLICATIONS

International Search Report issued in International Appln. No. PCT/KR2011/007681 on May 16, 2012, 2 pages.
F. Bauer et al.: "UV Curable Acrylate Nanocomposites: Properties and Applications," Journal of Polymer Research (2005), vol. 12, pp. 483-491, Sep. 21, 2005.
H. Zou et al.: "Polymer/Silica Nanocomposites: Preparation, Characterization, Properties, and Applications," J. Chem. Rev. 2008, vol. 108, pp. 3893-3957, Aug. 23, 2008.
F. Bauer et al."Preparation of Scratch and Abrasion Resistant Polymeric Nanocomposites by Monomer Grafting onto Nanoparticles, 3a Effect of Filler Particles and Grafting Agents," Macromol. Mater. Eng. 2002,, vol. 287, pp. 546-552, Aug. 2002.

* cited by examiner

*Primary Examiner* — Nathan M Nutter
(74) *Attorney, Agent, or Firm* — Rothwell, Figg, Ernst & Manbeck, P.C.

(57) ABSTRACT

The present invention relates to a resin mixture for melt processing, comprising a first resin; and a second resin comprising an acrylate-based copolymer including silica particles and having a polydispersity index (PDI) of 1 to 2.5, a method for preparing a resin-molded article using the same, and a resin-molded article. Surface characteristics of the molded article can be improved and excellent scratch resistance can be obtained by using the resin composition. In addition, processing time can be reduced, productivity is increased, and manufacturing costs are lowered by omitting the additional surface coating step.

14 Claims, 1 Drawing Sheet

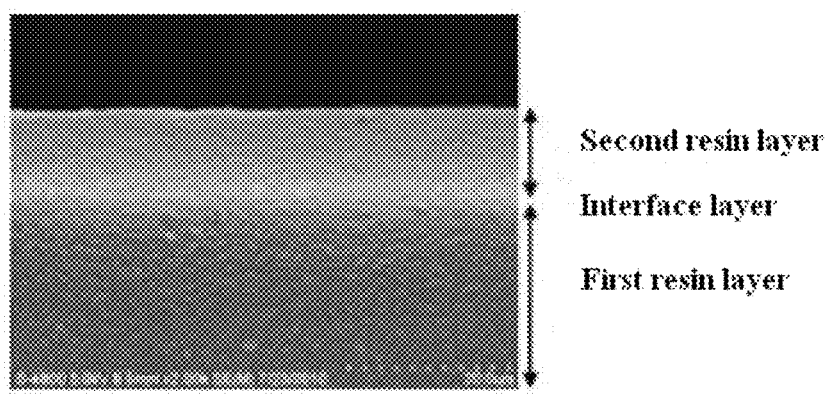

RESIN BLEND FOR MELTING PROCESS

BACKGROUND

1. Field of the Invention

The present application relates to a resin mixture for melt processing, a pellet, a method of preparing a resin-molded article using the same, and a resin-molded article prepared thereby, and, more particularly, to a resin mixture for melt processing capable of improving surface characteristics, such as scratch resistance, of a molded article and also exhibiting effects of reducing a processing time, enhancing productivity and cutting the production cost by omitting an additional surface coating step, a pellet, a method of preparing a resin-molded article using the same, and a resin-molded article prepared thereby.

2. Discussion of Related Art

Plastic resins are easily processed, and have excellent physical properties such as tensile strength, elastic modulus, heat resistance and impact resistance. Therefore, the plastic resins have been used in the field of various applications such as parts of an automobile, helmets, parts of electronic equipment, parts of a spinning machine, toys, or pipes.

In particular, since electric home appliances are used in living spaces, the plastic resins require functions of the electric home appliances themselves, and functions as in interior decorations as well. Also, since parts of an automobile and toys come in direct contact with human bodies, the plastic resins should be environmentally friendly and have excellent scratch-resistant characteristics. However, when plastic resins are exposed to external environments for a certain period of time, the plastic resins are generally decomposed and discolored easily by oxygen in the air, ozone, light and the like. Therefore, the plastic resins have a problem in that they are easily fragile due to low weather resistance and very low impact strength, and a surface of a molded article may also be easily scratched due to low surface hardness. As a result, a method of applying an additional painting or plating process to make up for the weak points of the plastic resins and improve surface characteristics has been generally used. However, such a painting or plating process has problems in that it may degrade efficiency and economic feasibility of a process of preparing a plastic resin, and use of the painting or plating process results in generation of a large amount of toxic substances during the process itself or disposal of products.

To solve the problems, various methods have been proposed to improve surface characteristics, such as scratch resistance, of plastic resins without using the painting or plating process. A method of adding inorganic particles into a plastic resin has been proposed to improve physical properties such as wear resistance and hardness. However, such a method has problems in that processability of the plastic resin may be degraded and a decrease in impact strength and gloss may be caused by addition of the inorganic particles. Also, a method of further adding a resin having excellent scratch resistance or heat resistance has been proposed to improve surface characteristics of a plastic resin. However, such a method has problems in that it requires an additional process such as curing a product after an injection process, and physical properties such as weather resistance, heat resistance or scratch resistance are not improved to a sufficient extent required for the product.

Accordingly, there is an increasing demand for development of methods capable of enhancing efficiency and economic feasibility of the process without performing a process of painting or plating a plastic resin, and improving surface characteristics, such as scratch resistance, of a molded article as well.

SUMMARY OF THE INVENTION

The present application is directed to providing a resin mixture for melt processing capable of improving surface characteristics, such as scratch resistance, of a molded article and also exhibiting effects of reducing a processing time, enhancing productivity and cutting the production cost by eliminating an additional surface coating step.

Also, the present application is directed to providing a pellet prepared using the resin mixture for melt processing.

In addition, the present application is directed to providing a method of preparing a resin-molded article using the resin mixture for melt processing.

Furthermore, the present application is directed to providing a resin-molded article exhibiting improved surface characteristics such as scratch resistance.

One aspect of the present application provides a resin mixture for melt processing, which includes a first resin, and a second resin including an acrylate-based copolymer including silica particles and having a polydispersity index (PDI) of 1 to 2.5.

Another aspect of the present application provides a pellet which includes a core including a first resin and a shell including a second resin. Here, the second resin includes an acrylate-based copolymer including silica particles, and has a polydispersity index (PDI) of 1 to 2.5.

Still another aspect of the present application provides a method of preparing a resin-molded article, which includes melt-processing the resin mixture.

Still another aspect of the present application provides a melt-processed resin-molded article including a first resin layer, a second resin layer formed on the first resin layer, and an interfacial layer formed between the first resin layer and the second resin layer and including a first resin and a second resin. Here the second resin layer includes an acrylate-based copolymer including silica particles.

Yet another aspect of the present application provides a melt-processed resin-molded article including a first resin layer; and a second resin layer formed on the first resin layer. Here, components of the first resin layer on a surface of the second resin layer are detected by means of an infrared spectrometer (IRS), and the second resin layer includes an acrylate-based copolymer including silica particles.

Hereinafter, the resin mixture for melt processing, the pellet, the method of preparing a resin-molded article using the same, and the resin-molded article according to specific exemplary embodiments of the present application will be described in further detail.

In the present application, the term "mixture" means a case in which a first resin and a second resin are uniformly mixed in one matrix, and a case in which a pellet formed of the first resin and a pellet formed of the second resin are uniformly mixed. For example, when the first resin and the second resin are uniformly mixed in the one matrix, it is meant that the first resin and the second resin are uniformly mixed in one pellet, so that the resulting mixture can be present in the form of a composition.

The term "melt processing" refers to a process of processing a resin by melting the resin at a temperature greater than or equal to a melting temperature ($T_m$), for example, injection, extrusion, blowing or foaming.

The term "layer separation" means a case in which a layer-separated region (for example, a second resin-rich region)

form a separate layer which may be observed separately from the remaining resin region (for example, a first resin-rich region). That is, a structure formed by the layer separation is different from a structure in which the remaining resin region and the layer-separated region are partially distributed in an entire resin mixture, for example, a sea-island structure. For example, the remaining resin region and the layer-separated region may be continuously present as separate layers. Such layer separation is preferably performed by separating a certain structure into two layers. However, the structure may be separated into three layers, as necessary.

The present inventors have experimentally found that, when a first resin and a second resin having scratch resistance are used herein, layer separation may easily occur during a melt processing process due to different physical properties of the first and second resins, and thus use of the layer separation may allow the first and second resins to exhibit an effect of selectively coating a surface of a pellet or a molded article without using a separate additional process. Therefore, the present application has been completed from the results.

Especially, since the second resin has a lower melt viscosity than the first resin, the layer separation may occur more easily during a process such as extrusion or injection. For example, the second resin may be positioned or distributed at a position at which the second resin comes in contact with the air. As a result, when the resin mixture for melt processing is used, a surface layer of the pellet or the molded article may be formed of the second resin without applying an additional coating process. Problems regarding the painting or plating process, for example, an increase in processing time and production cost, treatment with a coating agent used to improve hardness or antifouling properties and the like may be solved, and characteristics of the prepared pellet or molded article such as surface characteristics and scratch resistance may be improved.

The layer separation observed in the resin mixture for melt processing seems to occur due to polydispersity index of the second resin and different physical properties between the first resin and the second resin. Examples of the different physical properties may include surface energy, melt viscosity, or solubility parameter.

According to one exemplary embodiment of the present application, a resin mixture for melt processing including a first resin and a second resin may be provided. Here, the second resin includes an acrylate-based copolymer including silica particles, and has a polydispersity index (PDI) of 1 to 2.5.

The polydispersity index (PDI) of the second resin may be in a range of 1 to 2.5, or 1 to 2.3.

When the polydispersity index of the second resin is greater than 2.5, the first resin and the second resin may be easily miscible since the second resin has a low molecular weight, or fluidity of the second resin may be degraded since the second resin has a high molecular weight, which makes it difficult to facilitate occurrence of the layer separation.

A surface energy difference between the first resin and the second resin at 25° C. may be in a range of 0.1 to 35 mN/m, 1 to 30 mN/m, or 1 to 20 mN/m. After extrusion or injection of the resin mixture, the resin first comes in contact with the air. In this case, since the resin becomes fluidic, the second resin exhibiting hydrophobicity due to low surface energy is allowed to move to a surface of a molded article coming in contact with the air. As a result, the second resin constitutes a surface layer of the molded article. Therefore, when the surface energy difference is too small, the first resin and the second resin may be easily miscible, which makes it difficult to facilitate occurrence of the layer separation and movement of the second resin to the surface of the molded article. On the other hand, when the surface energy difference is too high, the first resin and the second resin are not bound to each other, but separated or peeled from each other.

The surface energy difference refers to a surface energy difference between the first resin and the second resin, or a surface energy difference between the first resin layer and the second resin layer.

Also, the melt viscosity difference between the first resin and the second resin at a processing temperature of the resin mixture and a shear rate of 100 to 1,000 $s^{-1}$ may be in a range of 0.1 to 3,000 pa*s, or 1 to 2,000 pa*s. When the melt viscosity difference is very low, the first resin is easily miscible with the second resin, which makes it difficult to facilitate occurrence of the layer separation. On the other hand, when the melt viscosity difference is very high, the first resin may be peeled from the second resin without binding to the second resin.

The melt viscosity may be measured using capillary flow, and refers to a shear viscosity (pa*s) according to a certain processing temperature and shear rate (/s).

The 'shear rate' refers to a shear rate applied when processing the resin mixture. As a result, the shear rate may be adjusted according to a processing method.

The 'processing temperature' refers to a temperature at which the resin mixture is processed. For example, when the resin mixture is subjected to melt processing such as extrusion or injection, the processing temperature means a temperature applied in the melt processing process. The processing temperature may be adjusted according to the kind of resins subjected to the melt processing such as extrusion or injection. For example, a resin mixture including a first resin of an acrylonitrile butadiene styrene (ABS) resin and a second resin obtained from a methyl methacrylate-based monomer may have a processing temperature of 210 to 240° C.

Also, the melt viscosity difference may refer to a melt viscosity difference between the first resin and the second resin, or a melt viscosity difference between the first resin layer and the second resin layer.

In addition, a solubility parameter difference between the first resin and the second resin at 25° C. may be in a range of 0.001 to 10.0 $(J/cm^3)^{1/2}$, 0.01 to 5.0 $(J/cm^3)^{1/2}$, or 0.01 to 3.0 $(J/cm^3)^{1/2}$. Such solubility parameters refer to innate characteristics of a resin exhibiting solubility according to polarity of respective resin molecules. In general, the solubility parameters for each resin have been widely known in the related art. When the solubility parameter difference is very small, the first resin is easily miscible with the second resin, which makes it difficult to facilitate occurrence of the layer separation. On the other hand, when the solubility parameter difference is very high, the first resin may be peeled from the second resin without binding to the second resin.

Also, the solubility parameter difference may refer to a solubility parameter difference between the first resin and the second resin, or a solubility parameter difference between the first resin layer and the second resin layer.

Meanwhile, in the present application, the second resin in the resin mixture for melt processing has a weight average molecular weight ($M_w$) of 30,000 to 200,000, or 50,000 to 150,000.

When the weight average molecular weight of the second resin is less than 30,000, the first resin is easily miscible with the second resin. On the other hand, when the weight average molecular weight of the second resin is greater than 200,000, fluidity of the second resin may be degraded, which makes it difficult to facilitate occurrence of the layer separation.

Meanwhile, the first resin is a resin which mainly determines physical properties of a desired molded article, and may be selected according to the kinds of the desired molded article and process conditions used. A typical synthetic resin may be used as the first resin without limitation. Preferably, the first resin may include a styrene-based resin such as an ABS-based resin, a polystyrene-based resin, an acrylonitrile styrene acrylate (ASA)-based resin or a styrene-butadiene-styrene block copolymer-based resin; a polyolefin-based resin such as a high-density polyethylene-based resin, a low-density polyethylene-based resin, or a polypropylene-based resin; a thermoplastic elastomer such as an ester-based thermoplastic elastomer or an olefin-based thermoplastic elastomer; a polyoxyalkylene-based resin such as a polyoxymethylene-based resin or a polyoxyethylene-based resin; a polyester-based resin such as a polyethylene terephthalate-based resin or a polybutylene terephthalate-based resin; a polyvinyl chloride-based resin; a polycarbonate-based resin; a polyphenylene sulfide-based resin; a vinyl alcohol-based resin; a polyamide-based resin; an acrylate-based resin; an engineering plastic; a copolymer or mixture thereof.

Meanwhile, the resin mixture for melt processing exhibits the difference in physical properties as described above with respect to the first resin, and may further include a certain resin which may endow a surface of the desired molded article with some functions, for example, a wear-resistant resin, an anti-pollution resin, an anti-fingerprint resin, a colored resin, a pearl resin, a high-gloss resin, a glossless resin, a shielding resin, or a mixture thereof.

The second resin exhibits the difference in physical properties as described above with respect to the first resin, and refers to a resin which may endow a surface of the desired molded article with predetermined scratch resistance.

The second resin may include an acrylate-based copolymer including silica particles. When the acrylate-based compound contains the silica particles, the prepared molded article may have improved surface hardness or scratch resistance.

The acrylate-based copolymer may be synthesized from an acrylate-based resin, a methacrylate-based resin, or a derivative thereof, and may be copolymerized or cross-linked with the silica particles.

Meanwhile, the silica particles may include silica nanoparticles surface-treated with the acrylate-based compound. More particularly, the silica particles may include silica nanoparticles having a certain acrylate-based compound engrafted into a surface thereof.

Therefore, the second resin may include a copolymer of the acrylate-based copolymer and the silica nanoparticles surface-treated with the acrylate-based compound, a cross-linked product, or a mixture thereof.

The acrylate compound engrafted into the surface of the silica nanoparticles may include a compound represented by the following Formula 1.

[Formula 1]

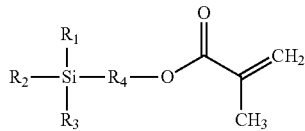

In Formula 1, $R_1$, $R_2$ and $R_3$ are the same as or different from each other, and each independently represent an alkoxy group having 1 to 16 carbon atoms, and $R_4$ represents an alkylene group having 1 to 16 carbon atoms.

Preferably, the alkoxy group may have 1 to 12 carbon atoms, or 1 to 6 carbon atoms, and the alkylene may have 1 to 12 carbon atoms, or 1 to 6 carbon atoms.

Specific examples of the acrylate compound engrafted into the surface of the silica nanoparticles may include γ-methacryloxypropyltrimethoxysilane, γ-methacryloxypropyltriethoxysilane, and the like.

The silica nanoparticles may have an average particle size of 10 to 100 nm. When the average particle size of the silica nanoparticles is very small, surface hardness or scratch resistance is improved to a slight extent by the surface-treated silica. On the other hand, when the average particle size of the silica nanoparticles is very high, surface characteristics or transparency of the resin may be degraded.

Also, the silica nanoparticles having an acrylate-based compound engrafted into a surface thereof may include silica at a content of 1 to 50 parts by weight, based on 100 parts by weight of the acrylate copolymer as a main component of the second resin. When the content of the silica is very small, surface hardness or scratch resistance is improved to a slight extent. On the other hand, when the content of the silica exceeds 50 parts by weight, stability may be drastically degraded upon preparation of the second resin.

Meanwhile, the second resin may further include a polymer resin having a bulky organic functional group which has a volume greater than or equal to a predetermined size. When the polymer resin having a bulky organic functional group is included in the second resin, the second resin may have a lower melt viscosity, and may move to a surface of the resin mixture for melt processing, which more easily comes in contact with the air in the resin mixture for melt processing, and thus the above-described layer separation may occur more easily in the process such as extrusion or injection. In addition, when the polymer resin having the specific functional group is included in the second resin, the second resin may have a higher glass transition temperature after thermal cross-linking in the process such as extrusion or injection. As a result, surface hardness of a final molded article may be further enhanced.

Specific examples of the bulky organic functional group having a volume greater than or equal to a predetermined size may include an alkyl group having 2 to 20 carbon atoms; an alicyclic ring having 5 to 40 carbon atoms and an aromatic ring having 6 to 40 carbon atoms; an alkyl group having 1 to 20 carbon atoms, which is substituted with a perfluoroalkyl group having 1 to 20 carbon atoms; a hydroxy alkyl group having 1 to 20 carbon atoms; or an alkyl group having 1 to 20 carbon atoms and containing an epoxy functional group.

Preferably, the alkyl group may have 2 to 20, 2 to 12, or 2 to 6 carbon atoms, the alicyclic ring may have 5 to 40, or 5 to 16 carbon atoms, and the aromatic ring may have 6 to 40, or 6 to 20 carbon atoms.

Therefore, the second resin may include a copolymer, a cross-linked product or a mixture including a) an acrylate-based copolymer including silica particles, preferably an acrylate-based copolymer including silica nanoparticles surface-treated with the acrylate-based compound; and b) polymer having a bulky organic functional group which has a volume greater than or equal to a predetermined size.

Also, the kind of the polymer resin having a bulky organic functional group which has a volume greater than or equal to a predetermined size is not particularly limited, but a (meth)acrylate-based resin, an epoxy-based resin, an oxetane-based resin, an isocyanate-based resin, a silicone-based resin, a fluorine-based resin, and a copolymer thereof may be used as the polymer resin.

The (meth)acrylate-based resin is a polymer including an acrylic or methacrylic monomer as a main component. For example, in addition to the methacrylate and the acrylate, the (meth)acrylate-based resin may include an alkyl methacrylate such as methyl methacrylate, ethyl methacrylate, propyl methacrylate, butyl methacrylate, cyclohexyl methacrylate, octyl methacrylate, lauryl methacrylate or stearyl methacrylate; an alkylacrylate such as methylacrylate, ethylacrylate, propylacrylate, butylacrylate, octylacrylate, laurylacrylate or stearylacrylate; or a glycidyl(meth)acrylate such as glycidyl methacrylate or glycidylacrylate, but the present application is not limited thereto.

The epoxy-based resin has an epoxy group introduced therein, and may, for example, include a bisphenol-type resin such as a bisphenol A-type resin, a bisphenol F-type resin, a bisphenol S-type resin and a hydrate thereof; a novolac-type resin such as a phenol novolac-type resin or a cresol novolac-type resin; a nitrogen-containing ring-type resin such as a triglycidylisocyanurate-type resin or a hydantoin-type resin; an alicyclic resin; an aliphatic resin; an aromatic resin such as a naphthalene-type resin or a biphenyl-type resin; a glycidyl-type resin such as a glycidylether-type resin, glycidylamine-type resin or a glycidylester-type resin; a dicyclo-type resin such as a dicyclopentadiene-type resin; an ester-type resin; or an etherester-type resin, but the present application is not limited thereto.

The oxetane-based resin is an organic compound which is formed by polymerization of an oxetane monomer containing one or more oxetane rings. For example, the oxetane-based resin may include a polyoxetane compound such as 1,4-bis[(3-ethyl-3-oxetanylmethoxy)methyl]benzene, di[1-ethyl(3-oxetanyl)]methylether, phenol novolac oxetane, terephthalate bisoxetane, or biphenylene bisoxetane, but the present application is not limited thereto.

The isocyanate-based resin is a resin containing an isocyanate group. For example, the isocyanate-based resin may include diphenylmethane diisocyanate (MDI), toluene diisocyanate (TDI), or isophorone diisocyanate (IPDI), but the present application is not limited thereto.

The silicone-based resin has a main chain formed through a siloxane bond which is a silicon-oxygen bond. For example, the silicone-based resin may include polydimethylsiloxane (PDMS), but the present application is not limited thereto.

The fluorine-based resin has a fluorine atom introduced therein. For example, the fluorine-based resin may include polytetrafluoroethylene (PTFE), polychlorotrifluoroethylene (PCTFE), polyvinylidene fluoride (PVDF), or polyvinyl fluoride (PVF), but the present application is not limited thereto.

Meanwhile, the second resin may include resins having a thermosetting functional group or a UV-curable functional group, or resins having both the thermosetting functional group and the UV-curable functional group. When the thermal cross-linkable functional group is included in the second resin, excessive cross-linking may be caused during a melt processing process such as extrusion or injection, which results in degraded hardness.

The resin mixture for melt processing may include the second resin at a content of 0.1 to 50 parts by weight, or 1 to 20 parts by weight, based on 100 parts by weight of the first resin.

When the second resin is included at a content less than 0.1 parts by weight, based 100 parts by weight of the first resin, the layer separation does not occur, whereas an increase in production cost may be caused when the second resin is included at a content greater than 50 parts by weight.

The resin mixture for melt processing may be prepared into a pellet using a melt processing process such as extrusion. The pellet prepared using the resin mixture for melt processing may have a structure in which the first resin is disposed at a central portion thereof and the second resin is layer-separated from the first resin to be disposed at a surface thereof.

According to one exemplary embodiment of the present application, a pellet including a core including a first resin and a shell including a second resin may be provided. Here, the second resin includes an acrylate-based copolymer including silica particles, and has a polydispersity index (PDI) of 1 to 2.5.

The details of the first resin and the second resin have been specifically disclosed above, and thus are omitted for clarity.

Meanwhile, according to another exemplary embodiment of the present application, a method of preparing a resin-molded article, which includes melt-processing the resin mixture for melt processing, may be provided.

As described above, since the second resin has lower surface energy or melt viscosity characteristics than the first resin, layer separation may occur during extrusion or injection of the resin mixture for melt processing. As a result, the layer separation may result in an effect of selectively coating a surface of a pellet or a molded article without performing a separate additional process.

In particular, since the second resin may move to a surface of the resin mixture which more easily comes in contact with the air in the resin mixture for melt processing to facilitate occurrence of the layer separation. Also, since a copolymer of a predetermined polymer resin and silica having an acrylate-based compound engrafted into a surface thereof is included in the second resin, the prepared resin-molded article may have further improved surface characteristics such as surface hardness, scratch resistance, and the like.

Also, the resin mixture may be prepared into a pellet through extrusion, and the prepared pellet may be then prepared into a molded article through injection. In addition, the resin mixture may be prepared into a molded article through melt processing such as direct injection.

The temperature may vary according to the kinds of the first and second resins used in the process of extruding or injecting the resin mixture for melt processing.

The method of preparing a resin-molded article may further include curing a product obtained by melt-processing the resin mixture, that is, a melt-processed article of the resin mixture. After the process such as extrusion or injection, a thermosetting process or a UV curing process may be further performed, and both the thermosetting process and the UV curing process may also be further performed. As necessary, chemical treatment may be carried out after the process such as extrusion or injection.

Meanwhile, the method of preparing a resin-molded article may further include forming a second resin before melt-processing the resin mixture for melt processing. In the forming of the second resin, a method such as bulk polymerization, solution polymerization, suspension polymerization or emulsion polymerization may be used.

The forming of the second resin may include dispersing at least one polymer resin, which is selected from the group consisting of a (meth)acrylate-based resin, an epoxy-based resin, an oxetane-based resin, an isocyanate-based resin, a silicone-based resin, a fluorine-based resin and a copolymer thereof, and silica surface-treated with the acrylate-based compound in a reaction solvent; adding at least one additive selected from the group consisting of a chain transfer agent, an initiator and a dispersion stabilizer to the reaction solvent and mixing the additive with the reaction solvent; and reacting the resulting mixture at a temperature of 40° C. or more (polymerization step).

The reaction solvent may be used without limitation as long as it is generally known to be able to be used to prepare a synthetic resin, a polymer or a copolymer. Examples of such a reaction solvent may include methyl isobutyl ketone, distilled water and the like.

The silica surface-treated with the acrylate-based compound is preferably silica having an acrylate-based compound engrafted into a surface thereof. For example, the silica may be added to the reaction solvent while being dispersed in an organic solvent.

Also, the method of preparing a resin-molded article may further include further dispersing the polymer resin, which has a bulky organic functional group having a volume greater than or equal to a predetermined size, in the reaction solvent. More particularly, the method of preparing a resin-molded article may further include further dispersing the polymer resin, which has at least one organic functional group selected from the group consisting of an alkyl group having 2 to 20 carbon atoms; an alicyclic ring having 5 to 40 carbon atoms and an aromatic ring having 6 to 40 carbon atoms; an alkyl group having 1 to 20 carbon atoms, which is substituted with an perfluoroalkyl group having 1 to 20 carbon atoms; a hydroxy alkyl group having 1 to 20 carbon atoms; and an alkyl group having 1 to 20 carbon atoms and containing an epoxy functional group, in the reaction solvent.

As the chain transfer agent which may be added to the reaction solvent, an alkyl mercaptan such as n-butyl mercaptan, n-dodecyl mercaptan, tert-dodecyl mercaptan, isopropyl mercaptan or n-aryl mercaptan; a halogen compound such as carbon tetrachloride; or an aromatic compound such as an α-methylstyrene dimer or an α-ethylstyrene dimer may be used, but the present application is not limited thereto.

As the initiator, a polymerization initiator generally known to be able to be used in suspension polymerization, for example, a peroxide such as octanoyl peroxide, decanoyl peroxide or lauroyl peroxide, or an azo-based compound such as azobisisobutyronitrile or azobis-(2,4-dimethyl)-valeronitrile may be used without particular limitation.

Examples of the dispersion stabilizer which may be included in the reaction solvent may include an organic dispersing agent such as polyvinyl alcohol, polyolefin-maleic acid, or cellulose, or an inorganic dispersing agent such as tricalcium phosphate, but the present application is not limited thereto.

The details of the first resin and the second resin have been described above, and thus detailed description thereof is omitted for clarity.

Meanwhile, according to still another exemplary embodiment of the present application, a resin-molded article including a first resin layer, a second resin layer formed on the first resin layer and an interfacial layer formed between the first resin layer and the second resin layer and including a first resin and a second resin may be provided. Here, the second resin layer includes an acrylate-based copolymer including silica particles.

The resin-molded article prepared from the resin mixture including the first resin and the second resin may have a layer separation structure in which a first resin layer is disposed at an inner part thereof and a second resin layer is formed on a surface thereof. Since the second resin included in the resin mixture has higher hydrophobic characteristics than the first resin due to the surface energy difference or melt viscosity, the layer separation may occur more easily during a process such as extrusion or injection, and the second resin may move easily to a surface of the resin-molded article coming in contact with the air having hydrophobicity. As a result, the resin-molded article having a structure in which the first resin layer is disposed at an inner part thereof and the second resin layer is disposed on a surface thereof may be provided. Such a resin-molded article may exhibit improved mechanical properties or surface characteristics, especially improved scratch resistance or high surface hardness, thereby eliminating a coating or painting process, reducing a processing time for production and the production cost, and enhancing productivity of a final product.

In particular, the second resin may include silica surface-treated with the acrylate-based compound, preferably silica having an acrylate-based compound engrafted into a surface thereof. As a result, the surface of the resin-molded article may have more improved scratch resistance or higher surface hardness, as described above.

The structure of the resin-molded article, that is, a structure in which the first resin layer and the second resin layer are divided by the interfacial layer and the second resin layer is exposed to external environments, is not known in the related art but is deemed to have novelty. When a typical resin is subjected to injection or extrusion, it is impossible to form such a structure, and it is also difficult to realize the effects according to the structure.

The 'first resin layer' refers to an inner region of a resin-molded article which predominantly includes the first resin. Also, the 'second resin layer' refers to an outer region of the resin-molded article which predominantly includes the second resin and endows a surface of the molded article with improved surface hardness or excellent scratch resistance characteristics.

Meanwhile, the resin-molded article may include an interfacial layer which is formed between the first resin layer and the second resin layer and includes a resin mixture of first and second resins. The interfacial layer formed between the layer-separated first resin layer and the second resin layer may serve as a boundary, and may include the resin mixture of first and second resins. In the resin mixture, the first resin and the second resin may be physically or chemically bound to each other. Also, the first resin layer may be bound to second resin layer via the resin mixture.

As described above, the resin-molded article may have a structure in which the first resin layer and the second resin layer are divided by the interfacial layer and the second resin layer are exposed to external environments. For example, the molded article may have a structure in which the first resin layer, the interfacial layer and the second resin layer are sequentially stacked in this sequence, or in which an interface and a second resin are stacked at upper and lower ends of the first resin. Also, the resin-molded article may have a structure in which the interface and the second resin layer sequentially surround the first resin layer having various 3D shapes, for example spherical, round, polyhedral and sheet-type shapes.

Meanwhile, the first resin layer, the second resin layer and the interfacial layer may be confirmed using a scanning electron microscope (SEM) by subjecting each test sample to a low-temperature impact test, followed by etching a fracture surface of the test sample with THF vapor. Also, the thickness of each layer may be measured by cutting a test sample using a diamond blade of microtoming equipment, making a cut section smooth and etching the smooth section with a solution which may be prepared to relatively more easily dissolve the second resin than the first resin. Different portions of the smooth section may be etched to different extents according to the contents of the first resin and the second resin, and the first resin layer, the second resin layer, the interfacial layer and a surface of the test sample may be observed by a shade difference, as viewed from a surface of the test sample at an angle of 45° using an SEM. Then, the thickness of each layer may be measured based on these facts. In the present application, a 1,2-dichloroethane solution (10% by volume in EtOH) is used as the solution prepared to relatively more easily dissolve the second resin, but this is described for purposes of illustration only. Therefore, solutions in which the second resin has higher solubility than the first resin are not particularly limited, and may be altered according to the kind and compositions of the second resin.

The interfacial layer may have a thickness of 0.01 to 95%, or 0.1 to 70%, based on the sum of thicknesses of the second resin layer and the interfacial layer. When the interfacial layer has a thickness of 0.01 to 95% based on the sum of thicknesses of the second resin layer and the interfacial layer, peeling between the first resin layer and the second resin layer does not take place due to excellent interfacial bond strength between the first resin layer and the second resin layer, and surface characteristics due to the presence of the second resin layer may be drastically improved. On the other hand, when the interfacial layer is much smaller in thickness than the sum of the thicknesses of the second resin layer and the interfacial layer, peeling between the first resin layer and the second resin layer may take place due to low bond strength between the first resin layer and the second resin layer, whereas the surface characteristics by the second resin layer may be slightly improved when the interfacial layer is much higher in thickness than the sum of the thicknesses of the second resin layer and the interfacial layer.

The second resin may have a thickness of 0.01 to 60%, 1 to 40%, or 1 to 20%, based on a total thickness of the resin-molded article. When the second resin layer has a thickness within a predetermined thickness range, a surface of a molded article may be endowed with some functions. When the second resin layer has a very small thickness, it is difficult to sufficiently improve surface characteristics of the molded article. On the other hand, when the second resin layer has a very high thickness, mechanical properties of a functional resin itself may be reflected in the resin-molded article to alter mechanical properties of the first resin.

The details of the first and second resins included in the first and second resin layers, and the acrylate-based copolymer including silica particles included in the second resin have been described above, and thus detailed description thereof is omitted for clarity.

Meanwhile, according to still another exemplary embodiment of the present application present application, a melt-processed resin-molded article including a first resin layer and a second resin layer formed on the first resin layer may be provided. Here, components of the first resin layer on a surface of the second resin layer are detected by means of an infrared spectrometer (IR), and the second resin layer includes an acrylate-based copolymer including silica particles.

The structure of the molded article, that is, a structure in which the components of the first resin layer on the surface of the second resin layer are detected by means of the IR spectrometer, is not known in the related art but is deemed to have novelty. In the typical coating process, it is difficult to detect the components of the first resin layer on the surface of the second resin layer.

As such, the surface of the second resin layer means a surface which does not face the first resin layer but is exposed to external environments.

Also, the component of the first resin layer means at least one of components included in the first resin layer.

The details of the first and second resins included in the first and second resin layers, and the acrylate-based copolymer including silica particles included in the second resin have been described above, and thus detailed description thereof is omitted for clarity.

Furthermore, according to yet another exemplary embodiment of the present application, parts of an automobile, helmets, parts of electronic equipment, parts of a spinning machine, toys and pipes, all of which include the melt-processed resin-molded article, may be provided.

According to the present application, a resin mixture for melt processing capable of improving mechanical properties and surface characteristics of a molded article and also exhibiting effects of reducing a processing time, enhancing productivity and cutting the production cost by omitting an additional surface coating step, a method of preparing a resin-molded article using the same, and a resin-molded article prepared thereby can be provided.

BRIEF DESCRIPTION OF THE DRAWINGS

The above and other objects, features and advantages of the present application will become more apparent to those of ordinary skill in the art by describing in detail exemplary embodiments thereof with reference to the attached drawings, in which:

FIG. 1 is a cross-sectional SEM image obtained by treating a smooth cross-section of melt-processed resin-molded article prepared in Example 1 with a solution which may be used to selectively dissolve a second resin.

DETAILED DESCRIPTION OF EXEMPLARY EMBODIMENTS

Hereinafter, exemplary embodiments of the present application will be described in detail. However, the present application is not limited to the embodiments disclosed below, but can be implemented in various forms. The following embodiments are described in order to enable those of ordinary skill in the art to embody and practice the present application.

Experimental Example 1

Measurement of Surface Energy

Surface energies of first resins and second resins used in the following Examples and Comparative Examples were measured according to an Owens-Wendt-Rabel-Kaelble method using a drop shape analyzer (DSA100 commercially available from KRUSS).

More particularly, each of the first resins and the second resins used in the following Examples and Comparative Examples was dissolved in a methyl ethyl ketone solvent at a content of 15% by weight, and the resulting mixture was bar-coated on a LCD glass plate. Thereafter, the coated LCD glass plate was pre-dried at 60° C. for 2 minutes in an oven, and then dried at 90° C. for one minute in the oven.

After drying (or curing), each of deionized water and diiodomethane was dropped 10 times on the coated surface at 25° C., and an average value of contact angles was calculated, and then applied to the Owens-Wendt-Rabel-Kaelble method to calculate surface energy.

Experimental Example 2

Measurement of Melt Viscosity

Melt viscosities of the first resins and the second resins used in Examples and Comparative Examples were measured using a capillary rheometer (Capillary Rheometer 1501 commercially available from Gottfert).

More particularly, a capillary die was attached to a barrel, and the second resin, the first resin or the test sample was put into the barrel at three divided doses. Thereafter, the shear viscosity (pa*s) of the second resin, the first resin or the test sample was measured at a processing temperature of 240° C. and a shear rate of 100 to 1,000 s$^{-1}$.

Experimental Example 3

Measurement of Solubility Parameter

There are several methods of measuring and calculating a solubility parameter. In the following Examples and Comparative Examples, however, the solubility parameter is calculated at 25° C. using a known method, for example, a van Krevelen method [see Bicerano, J. Prediction of polymer properties, third edition, Marcel Dekker Inc., NewYork (2002)]. The van Krevelen method is a method in which the solubility parameter was calculated using the group contribution theory. Here, the solubility parameter is defined by the following equation.

In the equation, $E_{coh}$ represents cohesive energy, V represents a molar volume, and $e_{coh}$ represents a cohesive energy density. In this case, the cohesive energy ($E_{coh}$) is as defined below.

In the equation, each of $^0X$, $^1X$, $^0X^v$, and $^1X^v$ represents a connectivity index, and $N_{VKH}$ represents a correlation coefficient. Here, the connectivity indexes and the correlation coefficient were calculated with reference to the following literature [see Bicerano, J. Prediction of polymer properties, third edition, Marcel Dekker Inc., NewYork (2002)].

Experimental Example 4

Observation of Cross-Section Shape

The test samples prepared in Examples and Comparative Examples were subjected to a low-temperature impact test, and fracture surfaces of the test samples were etched with THF vapor. Thereafter, layer-separated cross-section shapes of the test samples were observed using an SEM.

Meanwhile, to measure thicknesses of the layer-separated first resin layer, second resin layer and interfacial layer, the cross-sections of the test samples prepared in the following Examples and Comparative Examples were cut at a temperature of −120° C. using a diamond blade of a microtoming equipment (Leica EM FC6), and made smooth. The microtomed smooth cross-sections of the test samples were dipped in a 1,2-dichloroethane solution (10% in EtOH), etched for 10 seconds, and then washed with distilled water. The different portions of the cross-sections were etched to different extents according to the contents of the first resin and the second resin, and observed using an SEM. That is, the first resin layer, the second resin layer and the interfacial layer could be observed by a shade difference, as viewed from a surface of the test sample at an angle of 45°. Then, the thickness of each layer may be measured using the results.

Experimental Example 5

Experiment for Measuring Pencil Hardness

Surface pencil hardness of the test samples prepared in Examples and Comparative Examples was measured under a constant load of 500 g using a pencil durometer (commercially available from ChungbukTech). Scratches are applied to a reference pencil (commercially available from Mitsubishi) at a constant angel of 45° while altering the pencil hardness from 6B to 9H, and a surface change of the pencil was observed (ASTM 3363-74). The pencil hardness of the test sample was calculated as an average value of the experiments which were performed 5 times in the following Examples and Comparative Examples.

Experimental Example 6

Measurement of Polydispersity Index (PDI)

The polydispersity index was measured using gel permeation chromatography (GPC). The conditions of the GPC are as listed below.
  Equipment: 1200 Series commercially available from Agilent technologies
  Column: Two PLgel mixed B columns commercially available from Polymer laboratories
  Solvent: THF
  Column temperature: 40° C.
  Sample concentration: 1 mg/mL, 100 L injected
  Standard: Polystyrene (Mp: 3,900,000, 723,000, 316,500, 52,200, 31,400, 7200, 3,940, 485)
  ChemStation commercially available from Agilent technologies was used as an analysis program, and a weight average molecular weight (Mw) and a number average molecular weight (Mn) of the polystyrene standard were calculated using GPC, and a polydispersity index (PDI) was calculated from the weight average molecular weight/number average molecular weight (Mw/Mn).

Experimental Example 7

Experiment for Measuring Impact Strength

Impact strengths of the test samples prepared in Examples and Comparative Examples were measured according to the ASTM D256 standard. More particularly, energy (Kg*cm/cm) required to destroy a test sample having a V-shaped notch when a weight hung on the end of a pendulum was dropped on the test sample was measured using an impact tester (Impact 104 commercially available from Tinius Olsen). The ⅛" and ¼" test samples were measured five times to calculate an average energy value.

Experimental Example 8

Surface Analysis Using Infrared Spectrometer (IRS)

An UMA-600 infrared microscope equipped with a Varian FTS-7,000 spectroscope (Varian, USA) and a mercury cadmium telluride (MCT) detector was used, and spectrum measurement and data processing were performed using Win-IR PRO 3.4 software (Varian, USA). The measurement conditions are described as follows.
  Germanium (Ge) attenuated total reflection (ATR) crystals having a refractive index of 4.0
  Mid-infrared spectra are scanned 16 times using an ATR method with a spectral resolution of 8 cm$^{-1}$ at wavelengths spanning from 4,000 cm$^{-1}$ to 600 cm$^{-1}$.
  Internal reference band: carbonyl group of acrylate (C═O str., approximately 1,725 cm$^{-1}$).
  Innate component of first resin: butadiene compound [C═C str. (approximately 1,630 cm$^{-1}$) or ═C—H out-of-plane vib. (approximately 970 cm$^{-1}$)].

Peak intensity ratios [$I_{BD}$(C═C)/$I_A$(C═O)] and [$I_{BD}$(out-of-plane)/$I_A$(C═O)] were calculated, and spectrum measurements were performed five times on different regions in one sample to calculate an average value and a standard deviation.

Example 1

(1) Preparation of Second Resin 520 g of methyl methacrylate, 240 g of tert-butyl methacrylate, 108 g of a solution (20 nm) including dispersible nanosilica at 37% by weight, 2.4 g of n-dodecyl mercaptan, and 1,427 g of methyl isobutyl ketone were put into a 3 L reactor, and dissolved. Thereafter, when an inner temperature of the reaction solution reached 65° C., 2.4 g of azobisisobutyronitrile was added, and then polymerized for 18 hours. Then, the reaction solution in which the polymerization reaction was completed was mixed with methanol, and the precipitating polymer resin was recovered, and dried in an oven to obtain a second resin.

The solution including dispersible nanosilica at 37% by weight was prepared by dispersing 20 nm silica, which had γ-methacryloxypropyltrimethoxysilane (or trimethoxysilylpropyl methacrylate) engrafted into a surface thereof, in a methyl isobutyl ketone solution.

(2) Preparation of Resin Mixture and Molded Article Using the Resin Mixture 7 parts by weight of the second resin was mixed with 93 parts by weight of the first resin (a thermoplastic resin including methyl methacrylate at 60% by weight, acrylonitrile at 7% by weight, butadiene at 10% by weight, and styrene at 23% by weight), and the resulting mixture was extruded at a temperature of 240° C. in a twin screw extruder (commercially available from Leistritz) to obtain a pellet. Thereafter, the pellet was injected at a temperature of 240° C. in an EC100Φ30 injector (commercially available from ENGEL) to prepare a test sample of a resin-molded article having a thickness of 3,200 μm.

(3) Measurement of Physical Properties of Test Sample

The physical properties of the test sample prepared as described above were measured. As a result, it was revealed that the second resin layer had a thickness of 79 μm, the interfacial layer had a thickness of 24 μm, the surface energy difference was 1.1 mN/m, the melt viscosity difference was 298 pa*s, the solubility parameter difference was 0.5 (J/cm$^3$)$^{1/2}$, the weight average molecular weight of the second resin measured by GPC was 100 K, and the polydispersity index was 2.1. Also, it was confirmed that the impact strengths were 6.5 kg·cm/cm in case of IZOD ⅛" and 6.1 kg·cm/cm in case of IZOD ¼", the pencil hardness was 3H, and the layer separation took place.

The peak intensity ratio [$I_{BD}$(C═C)/$I_A$(C═O)] measured by the infrared spectrometer was 0.0122 on the average with a standard deviation of 0.0004, and the peak intensity ratio [$I_{BD}$(out-of-plane)/$I_A$(C═O)] was 0.411 on the average with a standard deviation of 0.0026.

Example 2

(1) Preparation of Second Resin

A second resin was prepared in the same manner as in Example 1, except that cyclohexyl methacrylate was used instead of tert-butyl methacrylate.

(2) Preparation of Resin Mixture and Molded Article Using the Resin Mixture A resin-molded article test sample having a thickness of 3,200 μm was prepared in the same manner as in Example 1, except that 7 parts by weight of the second resin prepared thus was used.

(3) Measurement of Physical Properties of Test Sample

The physical properties of the test sample prepared as described above were measured. As a result, it was revealed that the second resin layer had a thickness of 76 μm, the interfacial layer had a thickness of 23 μm, the surface energy difference was 1.4 mN/m, the melt viscosity difference was 401 pa*s, the solubility parameter difference was 0.6 (J/cm$^3$)$^{1/2}$, the weight average molecular weight of the second resin measured by GPC was 100 K, and the polydispersity index was 1.9. Also, it was confirmed that the impact strengths were 6.3 kg·cm/cm in case of IZOD ⅛" and 6.2 kg·cm/cm in case of IZOD ¼", the pencil hardness was 2.5H, and the layer separation took place.

Example 3

(1) Preparation of Second Resin

A second resin was prepared in the same manner as in Example 1, except that a solution (50 nm) including a dispersible nanosilica at 37% by weight was used instead of the solution (20 nm) including dispersible nanosilica at 37% by weight.

(2) Preparation of Resin Mixture and Molded Article Using the Resin Mixture A resin-molded article test sample having a thickness of 3,200 μm was prepared in the same manner as in Example 1, except that 7 parts by weight of the second resin prepared thus was used.

(3) Measurement of Physical Properties of Test Sample

The physical properties of the test sample prepared as described above were measured. As a result, it was revealed that the second resin layer had a thickness of 75 μm, the interfacial layer had a thickness of 30 μm, the surface energy difference was 1.0 mN/m, the melt viscosity difference was 388 pa*s, the solubility parameter difference was 0.5 (J/cm$^3$)$^{1/2}$, the weight average molecular weight of the second resin measured by GPC was 100 K, and the polydispersity index was 2.2. Also, it was confirmed that the impact strengths were 7.1 kg·cm/cm in case of IZOD ⅛" and 6.9 kg·cm/cm in case of IZOD ¼", the pencil hardness was 2.5H, and the layer separation took place.

Example 4

(1) Preparation of Second Resin

A test sample was prepared in the same manner as in Example 1, except that 440 g of methyl methacrylate, 240 g of tert-butyl methacrylate, 326 g of the solution (20 nm) including a dispersible nanosilica at 37% by weight, 2.4 g of n-dodecyl mercaptan and 1,289 g of methyl isobutyl ketone were put into the 3 L reactor instead of 520 g of methyl methacrylate, 240 g of tert-butyl methacrylate, 108 g of the solution (20 nm) including a dispersible nanosilica at 37% by weight, 2.4 g of n-dodecyl mercaptan and 1,427 g of methyl isobutyl ketone.

(2) Preparation of Resin Mixture and Molded Article Using the Resin Mixture

A resin-molded article test sample having a thickness of 3,200 μm was prepared in the same manner as in Example 1, except that 7 parts by weight of the second resin prepared thus was used.

(3) Measurement of Physical Properties of Test Sample

The physical properties of the test sample prepared as described above were measured. As a result, it was revealed that the second resin layer had a thickness of 80 μm, the interfacial layer had a thickness of 22 μm, the surface energy difference was 1.2 mN/m, the melt viscosity difference was 260 pa*s, the solubility parameter difference was 0.5 $(J/cm^3)^{1/2}$, the weight average molecular weight of the second resin measured by GPC was 95 K, and the polydispersity index was 2.2. Also, it was confirmed that the impact strengths were 4.5 kg·cm/cm in case of IZOD ⅛" and 4.3 kg·cm/cm in case of IZOD ¼", the pencil hardness was 3H, and the layer separation took place.

Comparative Example 1

(1) Preparation of Second Resin

A test sample was prepared in the same manner as in Example 1, except that 560 g of methyl methacrylate, 240 g of phenylmethacrylate, 2.4 g of n-dodecyl mercaptan and 1,495 g of methyl isobutyl ketone were put into the 3 L reactor instead of 520 g of methyl methacrylate, 240 g of tert-butyl methacrylate, 108 g of the solution (20 nm) including a dispersible nanosilica at 37% by weight, 2.4 g of n-dodecyl mercaptan and 1,427 g of methyl isobutyl ketone.

(2) Preparation of Resin Mixture and Molded Article Using the Resin Mixture

A resin-molded article test sample having a thickness of 3,200 μm was prepared in the same manner as in Example 1, except that 7 parts by weight of the second resin prepared thus was used.

(3) Measurement of Physical Properties of Test Sample

The physical properties of the test sample prepared as described above were measured. As a result, it was revealed that the second resin layer had a thickness of 79 μm, the interfacial layer had a thickness of 24 μm, the surface energy difference was 1.1 mN/m, the melt viscosity difference was 390 pa*s, the solubility parameter difference was 0.5 $(J/cm^3)^{1/2}$, the weight average molecular weight of the second resin measured by GPC was 100 K, and the polydispersity index was 2.1. Also, it was confirmed that the impact strengths were 8.5 kg·cm/cm in case of IZOD ⅛" and 8.9 kg·cm/cm in case of IZOD ¼", the pencil hardness was 2H, and the layer separation took place.

Comparative Example 2

(1) Preparation of Second Resin

A test sample was prepared in the same manner as in Example 1, except that 560 g of methyl methacrylate, 240 g of tert-butyl methacrylate, 0.8 g of n-dodecyl mercaptan and 1,495 g of methyl isobutyl ketone were put into the 3 L reactor instead of 520 g of methyl methacrylate, 240 g of tert-butyl methacrylate, 108 g of the solution (20 nm) including a dispersible nanosilica at 37% by weight, 2.4 g of n-dodecyl mercaptan and 1,427 g of methyl isobutyl ketone, and 1.6 g of azobisisobutyronitrile, instead of 2.4 g, was added.

(2) Preparation of Resin Mixture and Molded Article Using the Resin Mixture

A resin-molded article test sample having a thickness of 3,200 μm was prepared in the same manner as in Example 1, except that 7 parts by weight of the second resin prepared thus was used.

(3) Measurement of Physical Properties of Test Sample

The physical properties of the test sample prepared as described above were measured. As a result, it was revealed that the surface energy difference was 1.0 mN/m, the melt viscosity difference was 2,200 pa*s, the solubility parameter difference was 0.7 $(J/cm^3)^{1/2}$, the weight average molecular weight of the second resin measured by GPC was 245 K, and the polydispersity index was 5.3. Also, it was confirmed that the impact strengths were 8.9 kg·cm/cm in case of IZOD ⅛" and 9.0 kg·cm/cm in case of IZOD ¼", the pencil hardness was H, and the layer separation did not take place.

Comparative Example 3

100 parts by weight of a pellet formed of the first resin (a thermoplastic resin including methyl methacrylate at 60% by weight, acrylonitrile at 7% by weight, butadiene at 10% by weight, and styrene at 23% by weight was dried in an oven, and injected at a temperature of 240° C. in an EC100Φ30 injector (commercially available from ENGEL) to prepare a test sample.

The test sample was coated with an anti-pollution hard coating solution (including DPHA at 17.5% by weight, PETA at 10% by weight, perfluorohexylethyl methacrylate at 1.5% by weight, an urethane acrylate (EB 1290 commercially available from SK Cytech) at 5% by weight, methyl ethyl ketone at 45% by weight, isopropyl alcohol at 20% by weight, and a UV initiator (IRGACURE 184 commercially available from Ciba) at 1% by weight), which was prepared by the present inventors and included a multifunctional acrylate, using Mayer bar #9, and dried at a temperature of 60 to 90° C. for approximately 4 minutes to form a film. Then, the coating composition was cured by irradiation with UV rays at an intensity of 3,000 mJ/cm² to form a hard coating film.

The hard coating film had a pencil hardness of 3H, and both the peak intensity ratios [$I_{BD}(C=C)/I_A(C=O)$] and [$I_{BD}$(out-of-plane)/$I_A(C=O)$] measured by the infrared spectrometer were 0 on the average with a standard deviation of 0.

What is claimed is:

1. A resin mixture for melt processing comprising:
   a first resin; and
   a second resin comprising an acrylate-based copolymer including silica particles and having a polydispersity index (PDI) of 1.9 to 2.5.

2. The resin mixture of claim 1, wherein the polydispersity index (PDI) of the second resin is in a range of 1.9 to 2.3.

3. The resin mixture of claim 1, wherein a surface energy difference between the first resin and the second resin at 25° C. is in a range of 0.1 to 35 mN/m.

4. The resin mixture of claim 1, wherein a melt viscosity difference between the first resin and the second resin at a shear rate of 100 to 1,000 s$^{-1}$ and a processing temperature of the resin mixture is in a range of 0.1 to 3,000 pa*s.

5. The resin mixture of claim 1, wherein a solubility parameter difference between the first resin and the second resin at 25° C. is in a range of 0.001 to 10.0 (J/cm$^3$)$^{1/2}$.

6. The resin mixture of claim 1, wherein the second resin has a weight average molecular weight ($M_w$) of 30,000 to 200,000.

7. The resin mixture of claim 1, wherein the silica particles comprises silica nanoparticles surface-treated with an acrylate-based compound.

8. The resin mixture of claim 7, wherein the acrylate-based compound bound to surfaces of the silica nanoparticles comprises a compound represented by the following Formula 1:

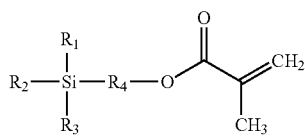

[Formula 1]

wherein $R_1$, $R_2$ and $R_3$ are the same as or different from each other, and each independently represent an alkoxy group having 1 to 16 carbon atoms, and $R_4$ represents an alkylene group having 1 to 16 carbon atoms.

9. The resin mixture of claim 7, wherein the silica nanoparticles have an average particle size of 10 to 100 nm.

10. The resin mixture of claim 1, wherein the first resin comprises at least one selected from the group consisting of a styrene-based resin, a polyolefin-based resin, a thermoplastic elastomer, a polyoxyalkylene-based resin, a polyester-based resin, a polyvinyl chloride-based resin, a polycarbonate-based resin, a polyphenylene sulfide-based resin, a vinyl alcohol-based resin, an acrylate-based resin, an engineering plastic, and a copolymer thereof.

11. The resin mixture of claim 1, wherein the second resin further comprises a polymer resin having at least one organic functional group selected from the group consisting of an alkyl group having 2 to 20 carbon atoms; an alicyclic ring having 5 to 40 carbon atoms and an aromatic ring having 6 to 40 carbon atoms; an alkyl group having 1 to 20 carbon atoms, which is substituted with an perfluoroalkyl group having 1 to 20 carbon atoms; a hydroxy alkyl group having 1 to 20 carbon atoms; and an alkyl group having 1 to 20 carbon atoms and containing an epoxy functional group.

12. The resin mixture of claim 11, wherein the polymer resin comprises at least one selected from the group consisting of a (meth)acrylate-based resin, an epoxy-based resin, an oxetane-based resin, an isocyanate-based resin, a silicone-based resin, a fluorine-based resin, and a copolymer thereof.

13. A method of preparing a melt-processed resin-molded article, comprising:
   melt-processing the resin mixture defined in claim 1.

14. The method of claim 13, further comprising:
   curing a melt-processed article of the resin mixture.

* * * * *